(12) United States Patent
Onoe (10) Patent No.: US 7,969,833 B2
(45) Date of Patent: Jun. 28, 2011

(54) OPTICAL DISC APPARATUS

(75) Inventor: Shinsuke Onoe, Fujisawa (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 311 days.

(21) Appl. No.: 12/333,554

(22) Filed: Dec. 12, 2008

(65) Prior Publication Data

US 2009/0154313 A1 Jun. 18, 2009

(30) Foreign Application Priority Data

Dec. 13, 2007 (JP) ................................ 2007-321487

(51) Int. Cl.
*G11B 7/00* (2006.01)
(52) U.S. Cl. ..................................................... 369/44.29
(58) Field of Classification Search .................. None
See application file for complete search history.

(56) References Cited

U.S. PATENT DOCUMENTS

| | | | | |
|---|---|---|---|---|
| 5,544,136 A * | 8/1996 | Horie | ........................... | 369/44.34 |
| 5,959,952 A * | 9/1999 | Wakuda | ..................... | 369/44.32 |
| 6,339,567 B1 * | 1/2002 | Shimamoto et al. | ........ | 369/44.35 |
| 6,437,936 B1 * | 8/2002 | Chen et al. | ................... | 360/77.04 |
| 6,563,663 B1 * | 5/2003 | Bi et al. | ....................... | 360/77.04 |
| 6,622,117 B2 * | 9/2003 | Deligne et al. | ................ | 702/190 |
| 6,845,068 B2 * | 1/2005 | Watanabe | .................... | 369/44.34 |
| 7,215,632 B2 * | 5/2007 | Horibe | ....................... | 369/124.11 |
| 7,626,782 B1 * | 12/2009 | Yu et al. | ..................... | 360/78.04 |
| 7,835,236 B2 * | 11/2010 | Ishimoto | .................... | 369/44.35 |
| 2002/0012191 A1 * | 1/2002 | Ho et al. | ..................... | 360/77.04 |
| 2002/0024899 A1 * | 2/2002 | Cho et al. | .................... | 369/44.32 |
| 2005/0128901 A1 * | 6/2005 | Takeda et al. | .............. | 369/44.29 |
| 2006/0061903 A1 * | 3/2006 | De Hoog | .................... | 360/77.04 |
| 2009/0028011 A1 * | 1/2009 | Onoe | ........................... | 369/44.32 |
| 2009/0059741 A1 * | 3/2009 | Ishimoto | .................... | 369/44.11 |
| 2009/0154313 A1 * | 6/2009 | Onoe | ........................... | 369/44.32 |

FOREIGN PATENT DOCUMENTS

| | | |
|---|---|---|
| JP | 09-050303 | 2/1997 |
| JP | 2003-249045 | 9/2003 |
| JP | 2007-207390 | 8/2007 |

* cited by examiner

*Primary Examiner* — Peter Vincent Agustin
(74) *Attorney, Agent, or Firm* — Kilpatrick Townsend & Stockton LLP (57) ABSTRACT

In servo control within an optical disc apparatus, when iterative learning control is started, the servo characteristics are modified to servo characteristic giving increased gains during a given period of time. Under this condition, the iterative learning control is provided.

5 Claims, 6 Drawing Sheets

OPTICAL DISC APPARATUS

INCORPORATION BY REFERENCE

The present application claims priority from Japanese application JP2007-321487 filed on Dec. 13, 2007, the content of which is hereby incorporated by reference into this application.

BACKGROUND OF THE INVENTION

The present invention relates to an optical disc apparatus for recording and reading information to and from an optical disc.

Periodic external disturbance caused by rotation of an optical disc is one factor causing a deviation in servo tracking performed in an optical disc apparatus. A known method of improving the capability to follow such periodic disturbance is iterative learning control (see, for example, JP-A-9-50303).

However, according to JP-A-9-50303, in the iterative learning control system, a control output is created for compressing rotation-synchronized vibrations using a position error signal produced one rotation earlier. It is known that during one rotation while the iterative learning control is in operation, the iterative learning control produces no effect.

Therefore, there is the problem that the repetitive compensator produces no action until a control error signal corresponding to one rotation of disc is accumulated in a memory inside the repetitive compensator whenever the mode of operation is switched to tracking control mode immediately after a seek operation. In an attempt to solve this problem, JP-A-2003-249045 discloses a method in which a repetitive compensator continues learning using values learned during tracking control prior to start of a seek operation as initial values immediately after a tracking operation is resumed subsequent to completion of the seek operation.

It is known that periodic external disturbances produced when an optical disc rotates include a component known as a deviation, in addition to eccentric and surface wobble components. JP-A-2007-207390 sets forth, "An optical disc having guide grooves may sometimes have ill-shaped groove portions (deviations) due to deterioration of the disc stamper or inferior formation of the disc. Where such a disc is rotated at a high multiple speed, wide-band peculiar noise components are introduced into the groove-reflected signal, especially near the outer periphery."

SUMMARY OF THE INVENTION

In a servo error signal used for control of a focus and tracking system, components not fully suppressed by the servo system appear as a residual error. Therefore, where the optical disc has surface wobble and eccentricity, the servo error signal is observed to contain a varying signal component of the rotational frequency. Similarly, where some tracks of the optical disc have distortion (deviations), the servo error signal is observed as a high-frequency, varying signal component.

Figure 10:
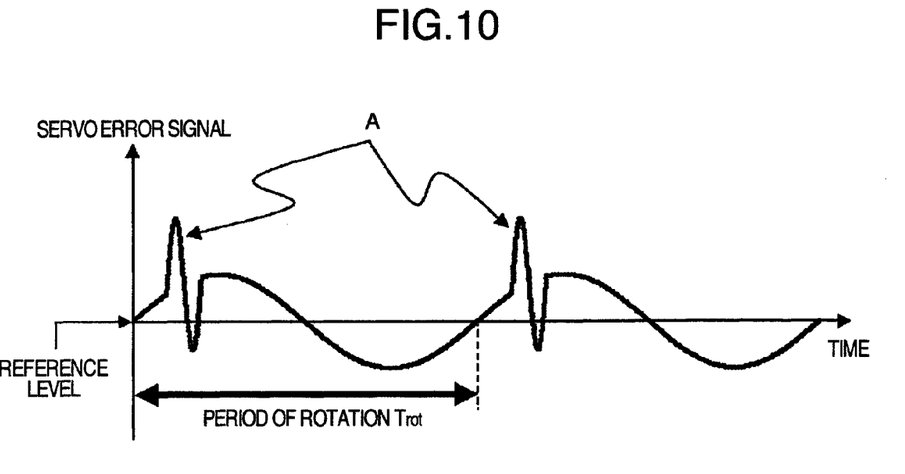
FIG. 10 is a waveform diagram illustrating a deviation component of a servo error signal.

FIG. 10 is a schematic diagram of a servo error signal produced when the beam passes across a deviated region. A high-frequency varying signal component that is observed in a servo error signal when the beam passes across such a deviated region is hereinafter referred to as a deviation component. As shown in FIG. 10, the servo error signal contains eccentric and surface wobble components varying at the rotational frequency, as well as the deviation component indicated by A. The deviation component is produced in synchronism with the period of rotation and has the feature that a substantially equal variable signal waveform appears from period to period of rotation, for the following reasons. The deviation is a local distortion arising from the manufacturing process of the optical disc, and is produced at a certain angle during one rotation of the optical disc. Another reason is that adjacent tracks are distorted into substantially identical forms. Because the deviation is a local distortion, even at the same angle on an optical disc, the deviation component is present and observed at a first radial position but not observed at a second radial position defining a different radius.

Since such a deviation component is a signal waveform synchronized with the period of rotation, the deviation component can be represented as a sum of a rotational frequency component and components of its harmonics by Fourier transform. Consequently, the deviation component can be suppressed by iterative learning control. However, as mentioned previously, the effects of the repetition control do not appear at least during one rotation from the start of the operation. The suppression depends only on the feedback control means. Hence, there is the problem that the degree of suppression achieved by the servo system is lower than in the steady state where the effects of the iterative learning control have appeared.

The physical accuracies in the focus direction and tracking direction of tracks traced by an optical disc apparatus are stipulated as optical disc standards. In practice, however, there is the possibility that optical discs having deviations not satisfying the standards are present on the market. In order to cope with such optical discs, the optical disc apparatus is required to have a servo system having better tracking performance than assumed by the standards. Meanwhile, there is a demand for a technique of shortening recording and reading times by using a higher multiple speed than required by the standards for optical discs complying with given standards. Also, in this case, better tracking performance than assumed by the standards is required.

Where tracking performance better than assumed by the standards is required as the performance of the servo system of an optical disc apparatus, the inventors of the present application found that the suppression of the gain becomes especially insufficient for external disturbances of high frequencies such as deviation components. The inventors of the present application have found that in the worst case, it is impossible to follow the tracks and the servo control becomes ineffective.

Where a seek operation is performed on a region where a high-frequency deviation component is present, for example, the optical beam passes across the deviation portion during the period of one rotation until the effects of iterative learning control appear. There is the danger that the servo control becomes ineffective. Even if the servo control does not become ineffective, surface wobble and eccentric components and deviation components are less suppressed under the condition where the iterative learning control is not yet effective. There is the possibility that the reading performance deteriorates and that address information cannot be read from the optical disc after the seek and thus the seek operation ends unsuccessfully. The degree of suppression achieved by the servo control is insufficient until the period of one rotation elapses after an iterative learning control operation is started. This may lead to a severe situation where the servo control becomes ineffective in cases where iterative learning control is started at a radial position where a deviation component is present.

The technique disclosed in JP-A-2003-249045 is available as a method of improving the tracking performance immediately after iterative learning control is started. This technique is based on the premise that the rotation-synchronized component stored in a memory during rotations prior to a seek operation does not vary after the seek operation. In the case of deviations, they are local distortions of tracks in the optical disc and so the varying component of the error signal occurring during the rotation at a radial position immediately after a seek operation is different from the varying component occurring during the rotation at a different radial position prior to the seek operation. Consequently, the technique disclosed in JP-A-2003-249045 produces insufficient suppressing effects.

In view of the foregoing problem, it is an object of the present invention to provide an optical disc apparatus which uses iterative learning control and which exhibits improved tracking performance.

The object of the present invention can be achieved, for example, by increasing the servo gain of a feedback control module for a given period of time after iterative learning control is started.

According to the present invention, the tracking performance of an optical disc apparatus can be improved.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENTS

Embodiments of the optical disc apparatus of the present invention are hereinafter described with reference to the drawings.

The present invention can be applied to both tracking control and focus control. In the following description, focus control is taken as an example.

Embodiment 1

Embodiment 1 of the present invention is described below. Embodiment 1 is a mode of practice for solving a first problem.

Figure 1:
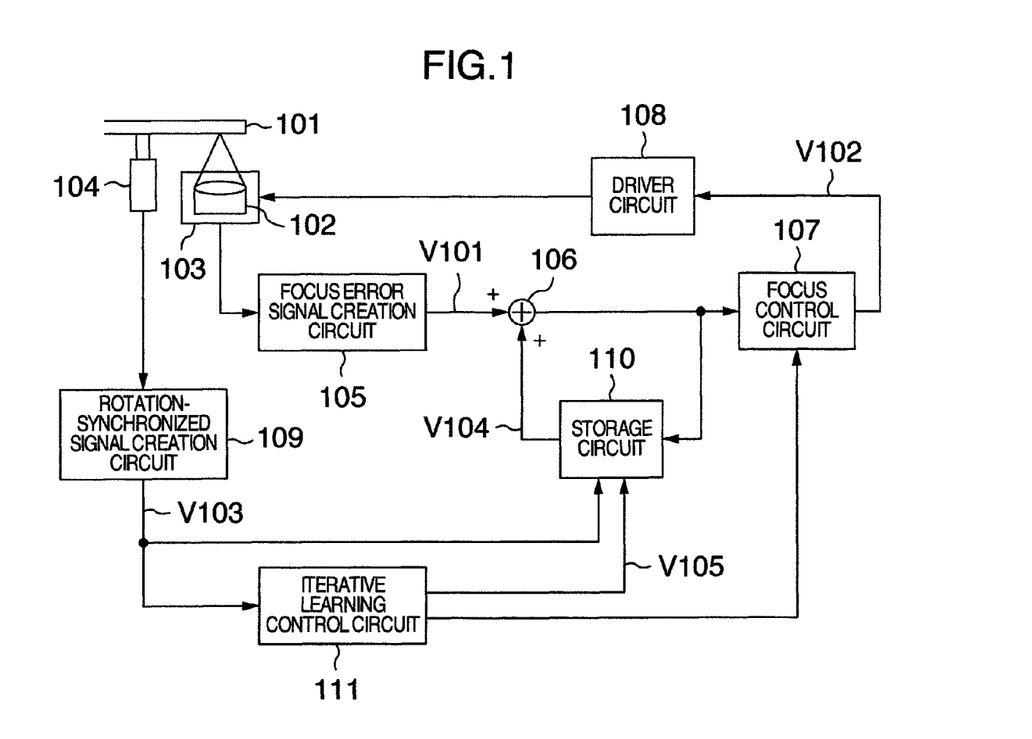
FIG. 1 is a block diagram showing Embodiment 1 of the present invention.

FIG. 1 is a block diagram showing main portions of an optical disc apparatus of the present embodiment.

Indicated by reference numeral 101 is an optical disc from which information is read by laser irradiation. Also, information held on the disc is erased by laser irradiation. Furthermore, information can be written onto the disc by laser irradiation.

Indicated by reference numeral 102 is an objective lens that focuses laser light onto the recording surface of the optical disc 101 by focusing the laser light.

Indicated by reference numeral 103 is an optical pickup equipped with a focus actuator (not shown). The pickup is also equipped with an optical detector (not shown) that detects light reflected from the optical disc 101 and outputs an electrical signal corresponding to the amount of the reflected light.

Indicated by reference numeral 104 is a spindle motor that rotationally drives the optical disc 101 at a given linear velocity. The period of rotation is hereinafter indicated by $T_{rot}$.

Indicated by reference numeral 105 is a focus error signal creation circuit that creates a focus error signal V101 from the output signal from an optical detector incorporated in the optical pickup 103 and outputs the signal.

Indicated by reference numeral 106 is an adder that adds the focus error signal V101 and an output signal from a storage circuit 110 (described later).

Indicated by reference numeral 107 is a focus control circuit that compensates the output signal from the adder 106 for gain and phase and creates a drive signal V102. Furthermore, the focus control circuit 107 modifies filter characteristics according to an instruction from an iterative learning control circuit 111 (described later).

Indicated by reference numeral 108 is a driver circuit that amplifies the drive signal V102 from the focus control circuit 107 and supplies the amplified signal to the focus actuator incorporated in the optical pickup 103.

Indicated by reference numeral 109 is a rotation-synchronized signal creation circuit, which creates a rotation-synchronized signal V103 having a duty cycle of 50% and a period of $T_{rot}/N$ (where N is a natural number) from the output signal from the spindle motor 104.

Indicated by reference numeral 110 is the storage circuit, which accepts the output signal from the adder 106 based on the rotation-synchronized signal V103, divides one rotation by N, and stores the value of the signal. Furthermore, the storage circuit outputs a compensation signal V104 for compensating for periodic external disturbances entered to the servo system based on the stored value. In addition, the storage circuit discards the stored values, based on a memory resetting signal V105 outputted from the iterative learning control circuit 111 (described later).

Indicated by numeral 111 is the iterative learning control circuit that controls iterative learning control. The iterative learning control circuit 111 gives an instruction to discard the value stored in the storage circuit 110 by the use of the memory resetting signal V105. The iterative learning control circuit 111 has an internal counter having a function of measuring the elapsed time from execution of a desired operation. Furthermore, the iterative learning control circuit 111 calculates the present period of rotation using the rotation-synchronized signal V103 as its input. For example, this can be calculated by measuring the elapsed time until the rising edge of the rotation-synchronized signal V103 is counted N times. As an example, a general CPU can be used as the iterative learning control circuit 111.

Figure 2:
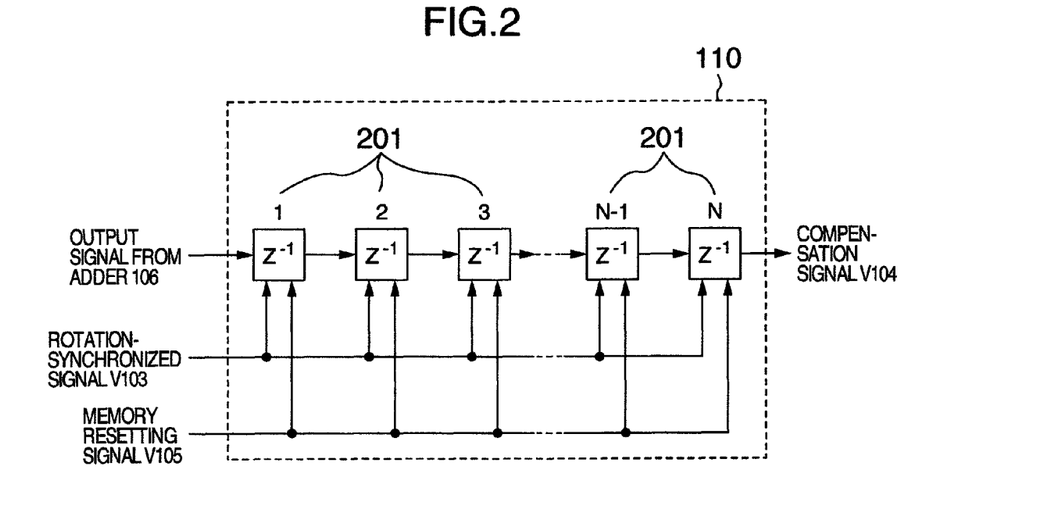
FIG. 2 is a diagram of a storage circuit of Embodiment 1 of the invention.

The configuration of the storage circuit 110 of the present embodiment is described by referring to FIG. 2. The storage circuit 110 is so designed that it is composed of N memory devices 201 connected in series. For example, each memory device 201 can be made of a D flip-flop. The storage circuit 110 outputs the value stored in the Nth memory device.

When the rising edge of the rotation-synchronized signal V103 is detected, each memory device 201 performs a shift register operation, i.e., the value stored in the previous stage of memory device is shifted to the following stage of memory device. In this way, the N memory devices 201 are successively updated at time intervals of $T_{rot}/N$. When the rising edge of the memory resetting signal V105 is detected, the N memory devices 201 constituting the storage circuit 110 discard the values held in the respective memory devices and overwrite with a zero level. This operation consisting of overwriting each memory device with a zero level is hereinafter referred to as resetting of the memory device.

It is assumed that in the present embodiment, the total number N of the memory devices constituting the storage circuit 110 is large enough to store the profile of the deviation component contained in the focus error signal V101.

Figure 3:
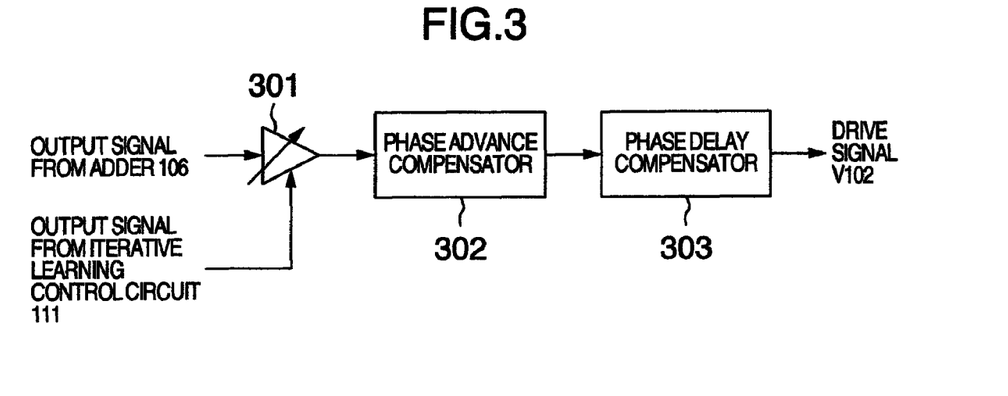
FIG. 3 is a block diagram of a focus control circuit of Embodiment 1 of the invention.

The configuration of the focus control circuit 107 of the present embodiment is next described by referring to FIG. 3. In the focus control circuit, a gain control device 301 providing a variable gain (also indicated by 301), a phase advance compensator 302, and a phase lag compensator 303 are connected in series.

A value set by the gain control device 301 under steady state as described later is herein referred to as a steady-state gain value. The gain control device 301 modifies the value of the gain under instructions from the iterative learning control circuit 111.

In the following, an operation for storing the value of a signal into the storage circuit 110 is defined to be included in "iterative learning control". According to this definition, "start of iterative learning control" is the "timing at which the output signal from the adder 106 is started to be recorded into the storage circuit 110". Storage of a signal corresponding to one rotation of the optical disc into the storage circuit 110 is not completed until at least one period of rotation elapses after the "start of iterative learning control". Under this state, the effects of the iterative learning control begin to appear in which the value of the signal stored in the immediately previous rotation was returned to the original value.

Figure 4:
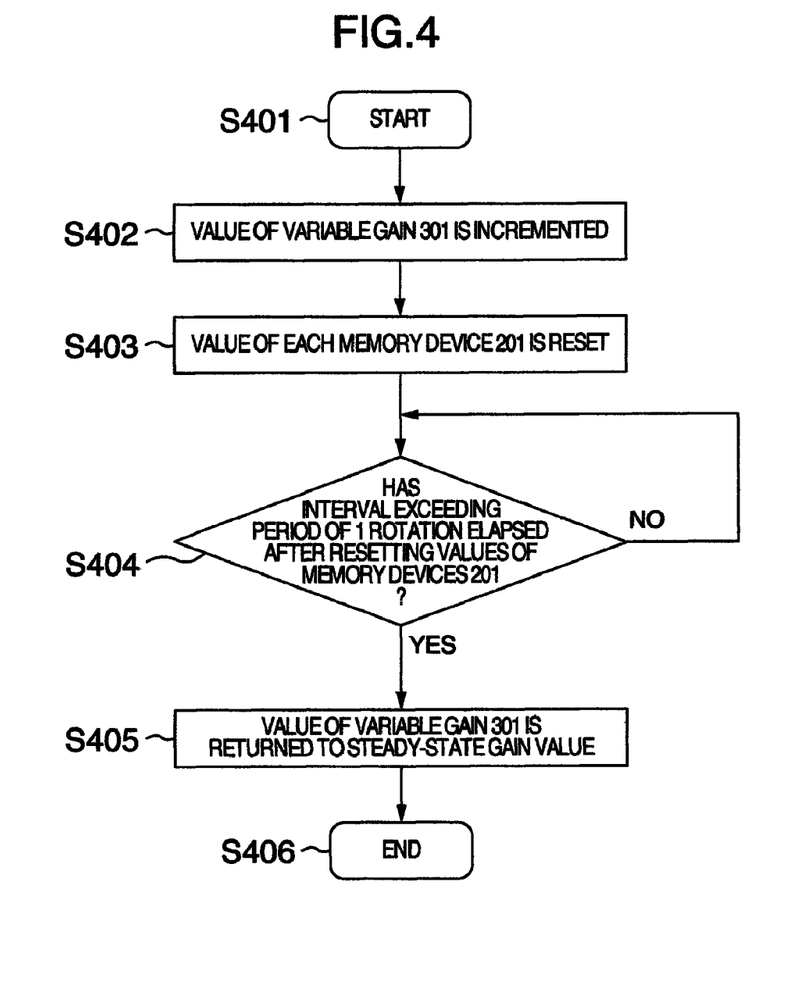
FIG. 4 is a flowchart illustrating a sequence of operations performed in Embodiment 1 of the invention.

The operation of the iterative learning control circuit 111 at the start of iterative learning control according to the present embodiment is next described by referring to the flowchart of FIG. 4.

When the iterative learning control is started (step S401), the iterative learning control circuit 111 increments the value of the variable gain 301 (step S402).

Then, the values of all the memory devices of the storage circuit 110 are reset (step S403). Thereafter, the value obtained after resetting the memory devices is read out as the compensation signal V104 until the period of one rotation elapses and so a zero level is outputted. Meanwhile, after execution of step S403, the value of signal is started to be recorded in the storage circuit 110. Therefore, if an interval longer than the period of one rotation elapses after step S403, the value of signal is recorded up to the Nth memory device of the storage circuit 110. As a result, a signal created based on the value of the signal stored during one previous rotation is started to be outputted as the compensation signal V104. That is, in the present embodiment, step S403 corresponds to start of iterative learning control.

Then, a decision is made as to whether the period of one rotation has elapsed after resetting the values of the memory devices (step S404). If the decision at step S404 is negative (NO), control returns to step S404. On the other hand, if the decision at step S404 is affirmative (YES), the value of the variable gain 301 is returned to the steady-state gain value (step S405), thus completing the sequence of operations to be conducted at the start of iterative learning control (step S406).

Figure 5:
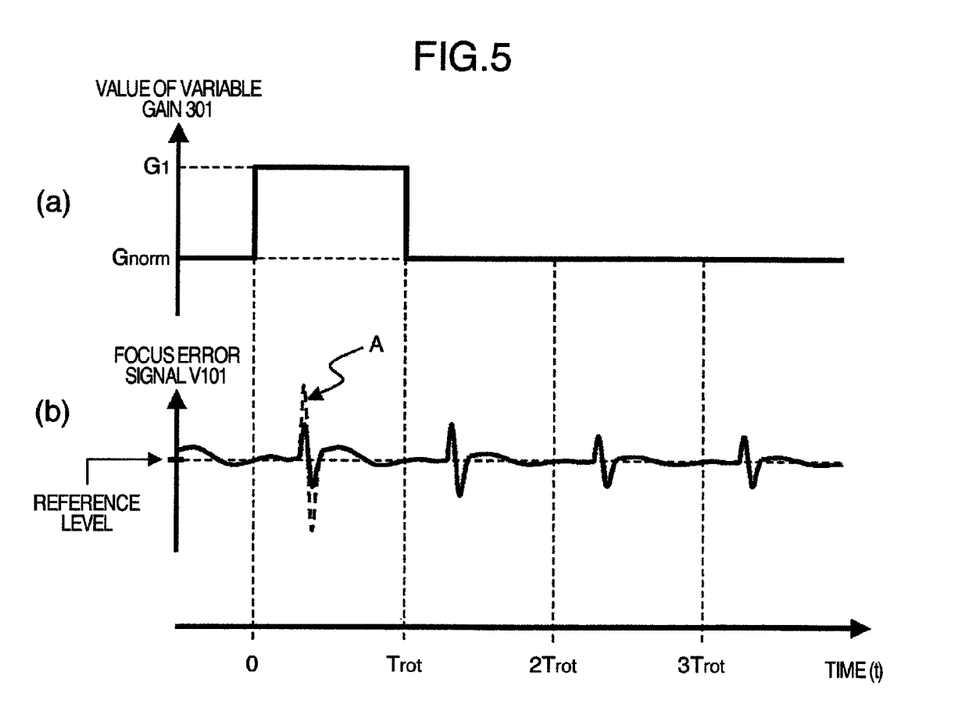
FIG. 5 is a waveform diagram illustrating a servo gain used in a modification of Embodiment 1 of the invention.

The advantages of the present embodiment are described by referring to FIG. 5, which is a schematic diagram illustrating the case where iterative learning control is started at a radial position of an optical disc where a deviation is present. The time axis is described, assuming that the timing (corresponding to step S403) at which the memory devices 201 are reset is t=0.

In the present embodiment, the iterative learning control does not work until the period of one rotation elapses after iterative learning control is started and a signal is started to be stored in the storage circuit. During this period ($0 \leq t \leq T_{rot}$), the value of the variable gain 301 increases (see (a) of FIG. 5). This in turn increases the servo gain of the feedback control system. Consequently, both surface wobble and deviation components are more suppressed.

In (b) of FIG. 5, the broken line indicated by A shows variation of the focus error signal V101 occurring when the value of the variable gain 301 is not increased. Note that the shown variation is only for the interval, $0 \leq t \leq T_{rot}$. In contrast, in the present embodiment, the value of the variable gain 301 is increased during the interval, $0 \leq t \leq T_{rot}$, and so the variation in the focus error signal V101 occurring when the beam passes through the deviation portion during the interval, $0 \leq t \leq T_{rot}$, is suppressed (see ( ) of FIG. 5).

On the other hand, during the interval, $T_{rot} \leq t$, the value of the variable gain 301 returns to its steady-state gain value. However, the compensation signal V104 based on the value of the signal stored during one previous rotation is started to be outputted. Therefore, during the interval, $T_{rot} \leq t$, the effects of iterative learning control begin to appear. The range of variation of the error signal in the deviation portion is suppressed.

As a result, even where a deviation is present during the period between the start of iterative learning control and the end of one rotation, the tracking performance can be improved.

In the description provided so far, the operation is performed to increase the variable gain 301 within the focus control circuit 107. The filter characteristics of the phase advance compensator 302 and phase delay compensator 303 may also be varied together with the variable gain 301. In this case, the filter characteristics may be so varied that the open loop servo characteristics give increased gains at low frequencies as shown in the diagram of the servo gain of FIG. 6.

Figure 6:
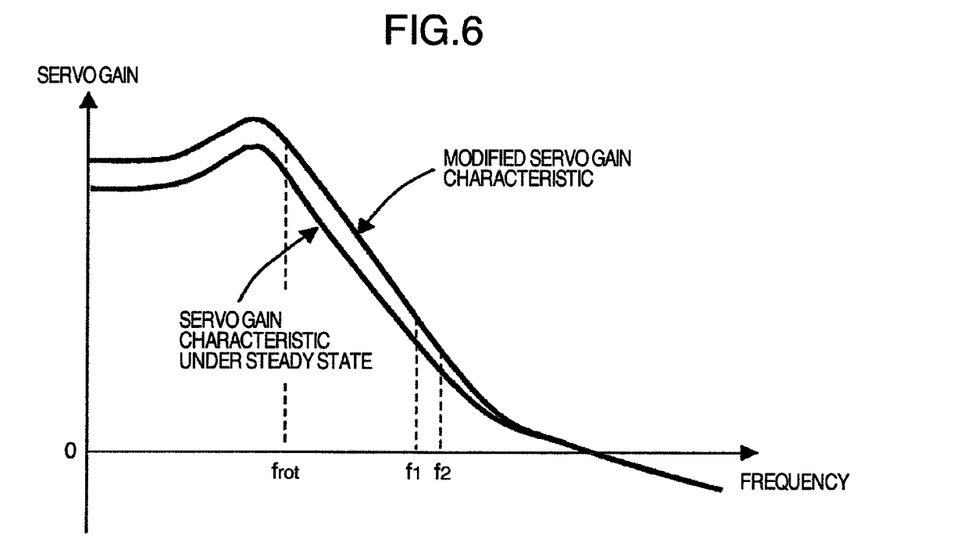
FIG. 6 is a waveform diagram illustrating Embodiment 1 of the invention.

In FIG. 6, $f_{rot}$ indicates the rotational frequency. A frequency range containing the deviation component is given by $f_1 < f < f_2$ (where f is a frequency). In the case of open-loop servo characteristics giving increased gains at low frequencies as shown in FIG. 6, surface wobble component and deviation component are more suppressed than steady-state open loop servo characteristics. Consequently, the same advantages as the foregoing advantages are obtained. The servo characteristics giving increased gains at low frequencies as shown in FIG. 6 can be accomplished by modifying the filter characteristics of the phase delay compensator 303 to characteristics giving increased gains at low frequencies.

The filter characteristics are so determined that the gain is increased at low frequencies as shown in FIG. 6. Consequently, increases in servo gain are limited to low-frequency components compared with the case where the gain is increased using only the gain control device 301. As a result, two advantages are obtained. A first advantage is that the servo control can be stabilized at the sub-resonance frequency because the servo gain does not increase at the sub-resonance frequency of the actuator lying in a high-frequency range. Another advantage is that the current consumption of the optical disc apparatus can be suppressed because undesired amplification of high-frequency components by the focus control circuit 107 is suppressed.

The focus control circuit 107 switches the used filter circuit between plural filter circuits. This eliminates the time taken to modify the filter characteristics. Consequently, it is assured that the servo control is stabilized when the filter characteristics are modified.

In the description provided so far, the variable gain 301 is increased during the period of one rotation after resetting of the values of the memory devices. The variable gain 301 is returned to its steady-state gain value simultaneously with appearance of the effects of iterative learning control. The interval during which the variable gain 301 is increased is not limited to the period of one rotation. The interval may also be the period of more than one rotation. That is, the operation may be so performed that the variable gain 301 is returned to its steady-state gain value after the instant ($t=T_{rot}$) at which the effects of iterative learning control begin to appear.

Because of the operations described so far, the optical disc apparatus according to Embodiment 1 compensates for lack of trackability induced immediately after the start of iterative learning control by increases in variable gain 301. As a result, the tracking performance of the servo system can be enhanced.

Embodiment 2

Embodiment 2 of the present invention is described below.

In Embodiment 1, the operation is so performed that the gain is returned to the steady-state gain value after a lapse of a given time since the variable gain 301 was increased. However, there is a difference in open loop gain characteristic of servo system between the first servo characteristic in which the variable gain 301 is increased and the second servo characteristic in which the variable gain 301 is returned to the steady-state gain value and iterative learning control is used. Accordingly, the waveform of variation of the error signal produced when the same track displacement is entered is different according to which servo characteristic is used.

Therefore, in the already described Embodiment 1, the variable gain 301 is returned to the steady-state gain value. The compensation signal V104 created based on the waveform indicating variation of the error signal produced when the beam passed with the first servo characteristic one rotation earlier ($0 \leq t \leq T_{rot}$ in FIG. 5) is applied to the servo loop until the optical disc rotates once ($T_{rot} \leq t < 2T_{rot}$ in FIG. 5) since the servo characteristic was modified to the second servo characteristic. Under this condition, iterative learning control is provided. As a result, especially during the rotation ($T_{rot} \leq t < 2T_{rot}$ in FIG. 5) occurring immediately after the variable gain 301 was returned to the steady-state gain value, the output of the iterative learning control does not suppress variation of the error signal. Rather, there is the possibility that the suppressing performance is deteriorated.

However, whether the suppressing performance deteriorates in Embodiment 1 depends on the amount of increase in the variable gain 301, also on the suppressing performance of iterative learning control, and furthermore on the frequency of the deviation component actually present on the optical disc 101 and the profile of the waveform indicating variation of the error signal when the beam passes through the deviation region. Therefore, the suppressing performance is not always deteriorated even in the optical disc apparatus shown in Embodiment 1.

In the present embodiment, the stability of the servo control is improved immediately after start of iterative learning control in view of the foregoing problems.

A block diagram showing an optical disc apparatus of the present embodiment is common with FIG. 1 that is a block diagram of an optical disc apparatus of Embodiment 1.

Figure 7:
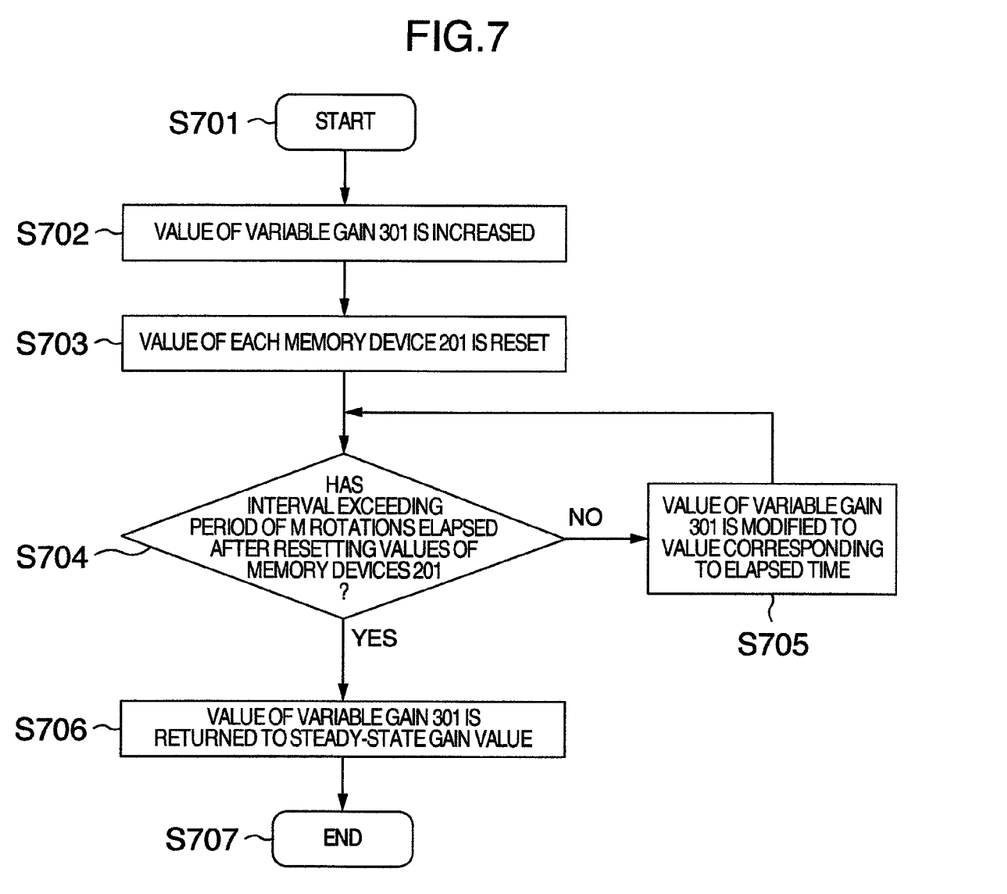
FIG. 7 is a flowchart illustrating a sequence of operations performed in Embodiment 2 of the invention.

The operation of the iterative learning control circuit 111 performed when iterative learning control of the present embodiment is started is described below by referring to the flowchart of FIG. 7.

When iterative learning control is started (step S701), the iterative learning control circuit 111 increases the value of the variable gain 301 (step S702).

Then, the values of all the memory devices of the storage circuit 110 are reset (step S703). Thereafter, the values obtained after resetting the memory values are outputted as the compensation signal V104 until the period of one rotation elapses and so a zero level is outputted. On the other hand, after step S703, recording of the value of the signal into the storage circuit 110 is started. Therefore, when an interval longer than the period of one rotation elapses after step S703, the value of the signal is recorded up to the Nth memory device of the storage circuit 110. As a result, a signal based on the value of the signal stored during one previous rotation is outputted as the compensation signal V104. That is, in the present embodiment, step S703 corresponds to start of iterative learning control.

A decision is made as to whether the period of M rotations (where M is a natural number) has passed since the values of the memory devices were reset (step S704). If the decision at step S704 is NO (i.e., the period of M rotations has not passed since the values of the memory devices were reset), the value of the variable gain 301 is modified to a value corresponding to the elapsed time from the resetting of the memory devices (step S705). At this time, the value of the variable gain 301 decreases with the elapsed time. A method of modifying the variable gain 301 in the present embodiment will be described later.

If the period of M rotations has elapsed since the values of the memory devices were reset (decision at step S704 is YES), the value of the variable gain 301 is returned to the steady-state gain value (step S706), thus completing the sequence of operations to be carried out at the start of iterative learning control (step S707).

Figure 8:
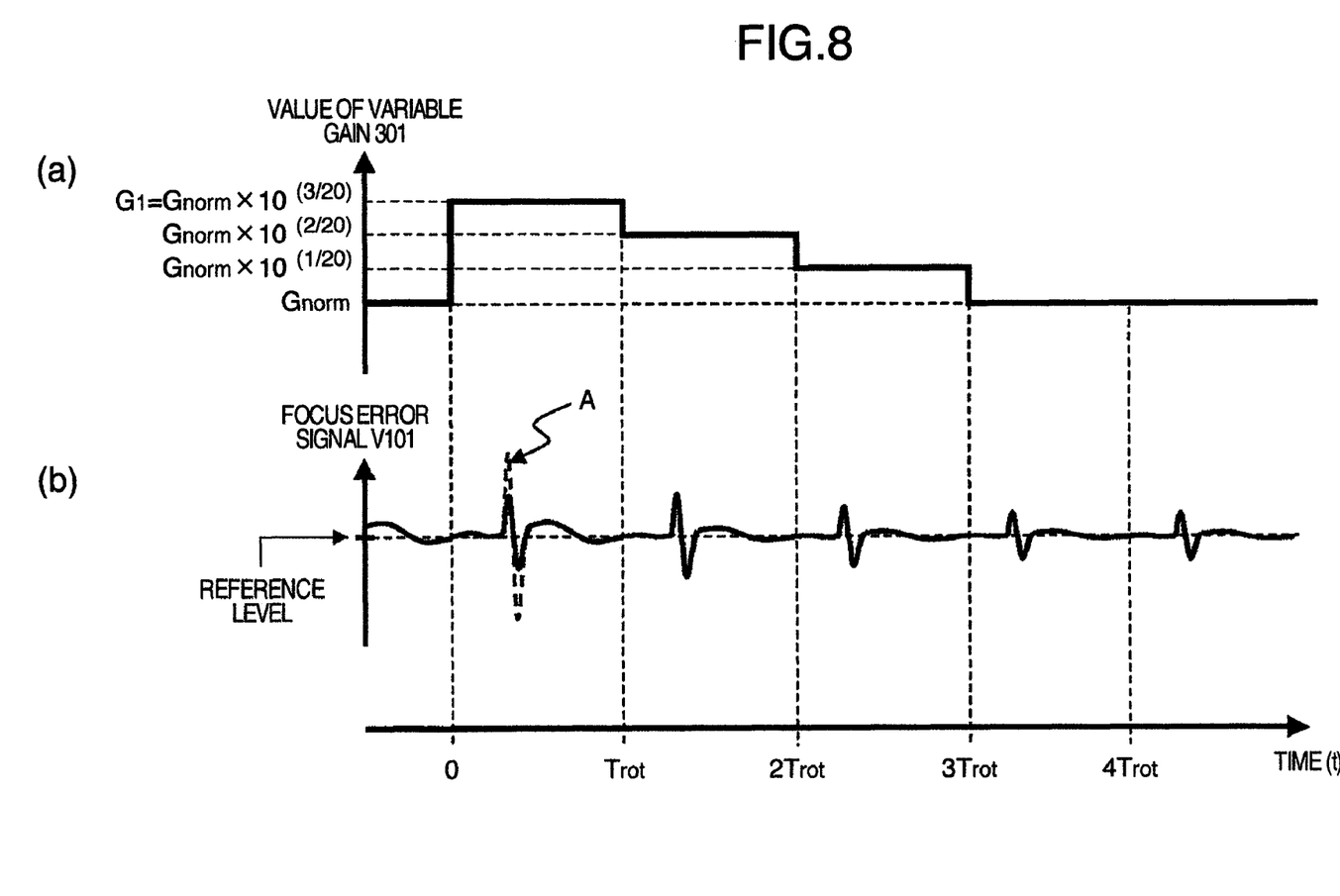
FIG. 8 is a waveform diagram illustrating Embodiment 2 of the invention.

The advantages of the present embodiment are described by referring to FIG. 8, which is a waveform diagram illustrating the case where iterative learning control is started at a radial position of an optical disc where a deviation is present. With respect to the time axis, it is assumed that the instant (corresponding to step S703) at which the values of the memory devices 201 are reset is set to t=0.

FIG. 8 shows a case where M=3. The variable gain 301 is modified in step S705 of the present embodiment at the instant when the elapsed time from resetting of the memory devices 201 becomes equal to an integral multiple of the period of rotation. The modified value is reduced linearly using a logarithmic scale.

Specifically, let $G_{norm}$ be the steady-state gain value. Let $G_1$ be the value of the variable gain 301 modified in step S702. Let t ($t<4T_{rot}$) be the elapsed time from resetting of the memory devices 201. The value $G_{val}$ of the variable gain 301 is determined according to the following Eq. (1):

$$G_{val}(t) = G_{norm} \times \left(\frac{G_1}{G_{norm}}\right)^{1-\frac{int(t/T_{rot})}{3}} \quad (1)$$

where int (N) is a function returning a maximum integer not exceeding N. As an example, it is here assumed that the value $G_1$ is greater than $G_{norm}$ by 3 dB. At this time, $G_{val}$ is larger than $G_{norm}$ by 3 dB during the interval, $0 \leq t < T_{rot}$. $G_{val}$ is larger than $G_{norm}$ by 2 dB during the interval, $T_{rot} \leq t < 2T_{rot}$. $G_{val}$ is larger than $G_{norm}$ by 1 dB during the interval, $2T_{rot} \leq t < 3T_{rot}$. By reducing the variable gain 301 in a stepwise fashion as shown in (a) of FIG. 8, the amount of variation in the servo gain occurring before and after the variable gain 301 was modified can be set to a small value of 1 dB.

In (b) of FIG. 8, the broken line A indicates variation of the focus error signal V101 when the value of the variable gain 301 is not increased. Note that the shown variation is only for the interval, $0 \leq t < T_{rot}$. In contrast, in the present embodiment, the value of the variable gain 301 is increased during the interval, $0 \leq t < T_{rot}$, and so the range of variation in the focus error signal V101 occurring when the beam passes through the deviation portion during the interval, $0 \leq t \leq T_{rot}$, is suppressed.

In the present embodiment, when the value of the variable gain 301 is modified at $t=T_{rot}$, the amount of variation is reduced. As a result, the difference in servo characteristics between the first rotation ($0 \leq t < T_{rot}$) after resetting of the memory devices and the second rotation ($T_{rot} \leq t < 2T_{rot}$) decreases. For this reason, the waveform indicating variation of the focus error signal V101 on passing through the deviation region becomes similar from period to period. As a result, the suppressing effects of iterative learning control on variation of the focus error signal V101 improves when the beam passes through the deviation region during the second rotation.

Similarly, the difference in servo characteristics between the second and third rotations is reduced. The difference in servo characteristics between the third and fourth or following rotations is reduced. Consequently, the output of the iterative learning control can suppress variations in the focus error signal V101.

The variable gain 301 is reduced with a lapse of time in this way. This is equivalent to gradually approaching the servo characteristics to the steady-state servo characteristics. As a result, the output of iterative learning control gradually varies with each rotation. Outputting of the iterative learning control can be started while suppressing variations in the focus error signal V101 on passing through the deviation region during each rotation.

In the operation described so far, the gain is reduced over the period of 3 rotations by assuming that M=3. The interval is not limited to the period of 3 rotations.

In the operation described so far, the variable gain 301 is reduced according to Eq. (1) above. The method of modifying the value of the variable gain 301 is not limited to Eq. (1). In the above operation, the variable gain 301 is modified with each period of rotation. The variable gain 301 may also be modified every integral multiple of the period of a rotation (e.g., every 2 rotations). In addition, the intervals at which the value of the variable gain 301 is modified are not limited to an integral multiple of the period of a rotation.

Furthermore, in the above operation, the variable gain 301 is reduced stepwise after the elapsed time from resetting of the memory devices 201 becomes an integral multiple of the period of a rotation. Alternatively, the value of the variable gain 301 may be reduced continuously based on the elapsed time.

Figure 9:
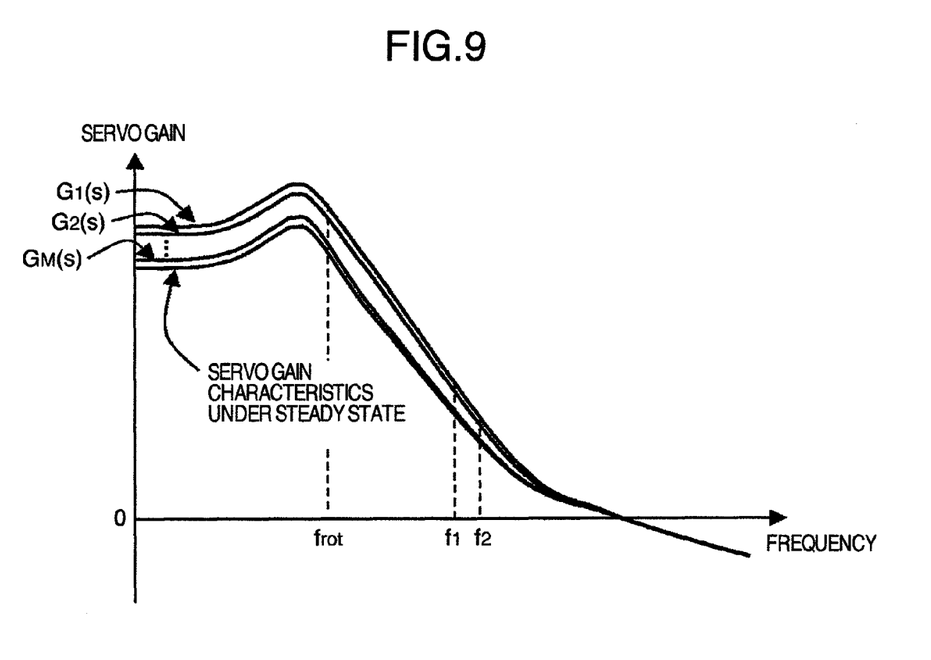
FIG. 9 is a waveform diagram illustrating a servo gain used in a modification of Embodiment 2 of the invention.

Additionally, in the operation described so far, the variable gain 301 within the focus control circuit 107 is modified. The filter characteristics of the phase advance compensator 302 and phase delay compensator 303 may be modified, in addition to the value of the variable gain 301. In this case, the filter characteristics may be modified to the filter characteristics $G_1(s)$ in which the open loop servo characteristics give increased gains at low frequencies as shown in the servo gain diagram of FIG. 9. Plural filter characteristics $G_2(s), \ldots, G_M(s)$ in which the amount of increase in the gain is reduced at low frequencies may be prepared. In step S705, the filter characteristic may be modified successively to filter characteristics providing successively reduced amounts of gain increase with a lapse of time. In FIG. 9, $f_{rot}$ indicates the rotational frequency. The frequency range in which a deviation component is contained is set to $f_1 < f < f_2$ (where f is a frequency). As shown in FIG. 9, servo characteristics providing increased gain values only at low frequencies can be accomplished, for example, by modifying the filter characteristic of the phase delay compensator 303 to a characteristic providing increased gains at low frequencies.

Increases in servo gain are limited to low-frequency components unlike the case where the gain is increased using only the gain control device 301, by setting the filter characteristic in such a way that the gain is increased at low frequencies as shown in FIG. 9. As a result, two advantages are obtained. A first advantage is that the servo control can be stabilized at the sub-resonance frequency because the servo gain does not increase at the sub-resonance frequency of the actuator lying in a high-frequency range. Another advantage is that the current consumption of the optical disc apparatus can be suppressed because undesired amplification of high-frequency components by the focus control circuit 107 is suppressed.

Because of the operations described so far, the optical disc apparatus according to Embodiment 2 compensates for lack of trackability immediately after iterative learning control by increases in variable gain 301. The tracking performance of the servo system obtained immediately after the start of outputting of iterative learning control can be improved by gradually returning the variable gain 301 to its steady-state gain value.

In the embodiment described so far, the focus control circuit 107 is designed to include the gain control device 301, phase advance compensator 302, and phase delay compensator 303 connected in series. The configuration of the focus control circuit 107 is not limited to this configuration. For example, the phase advance compensator and the phase delay compensator may be connected in parallel behind the gain control device.

In the embodiment described so far, the value of the variable gain 301 is modified simultaneously with start of iterative learning control. The value of the variable gain 301 may also be modified before the start of iterative learning control.

In the embodiments described so far, the period of rotation $T_{rot}$ is calculated from the output signal from the spindle motor 104. Means or module for calculating the period of rotation is not limited to this. For example, address information may be obtained from the output signal from the optical pickup 103, and the period of rotation $T_{rot}$ may be calculated from the address information.

In the embodiments described so far, the focus error signal V101 is stored in the storage circuit 110 for an interval corresponding to one rotation of the optical disc. The signal may also be stored for an interval corresponding to plural rotations.

In the iterative learning control used in the embodiments described so far, the focus error signal V101 is stored. The drive signal V102 may also be stored. Furthermore, signals inside the focus control circuit may also be stored.

It is obvious that the present invention can also be applied to tracking control.

While there have shown and described several embodiments in accordance with our invention, it should be understood that disclosed embodiments are susceptible of changes and modifications without departing from the scope of the invention. Therefor, it is not intended to be bound by the details shown and described herein but intend to cover all such changes and modifications that fall within the ambit of the appended claims.

The invention claimed is:

1. An optical disc apparatus for recording or reading information to or from an optical disc by irradiating the disc with laser light, said optical disc apparatus comprising:
    an optical detection module to produce an electrical output signal corresponding to the amount of light reflected from the optical disc;
    a servo error signal creation module to create a servo error signal from the output signal from the optical detection module;
    a feedback control module to create a drive signal for driving a servo actuator based on the servo error signal and to provide feedback control;
    a disc rotation module to rotate the optical disc;
    an addition module to add a compensation signal to a given signal within a servo loop, said compensating signal acting to compensate for periodical external disturbances entered to a servo system of the optical disc apparatus;
    a storage module to store an output signal from the addition module for an interval of time corresponding to at least one rotation of the optical disc; and
    an iterative learning control module to provide control of iterative learning control;
    wherein said iterative learning control module modifies filter characteristics set to said feedback control module to given filter characteristics providing increased gains;
    wherein outputting of the iterative learning control is started after a lapse of the period of at least one rotation after the modification of the filter characteristics; and
    wherein the filter characteristics set to said feedback control module are modified to steady-state servo characteristics after a lapse of a given time since the start of the outputting of the iterative learning control.

2. An optical disc apparatus as set forth in claim 1, wherein said given time is zero.

3. An optical disc apparatus as set forth in claim 1, wherein said given filter characteristics are servo characteristics giving a servo gain that is increased at least at low frequencies compared with the steady-state servo characteristics.

4. An optical disc apparatus as set forth in claim 1, wherein said feedback control module has a variable gain module which amplifies or attenuates the amplitude of an input signal regardless of the frequency of the input signal and which outputs the amplified or attenuated signal, and wherein said given filter characteristics are increased values of said variable gain module.

5. An optical disc apparatus as set forth in claim 1, wherein said feedback control module has a phase advance compensation module and a phase delay compensation module, and wherein said given filter characteristics have been obtained by modifying at least the filter characteristics of the phase delay compensation module.

* * * * *